US007801790B1

(12) United States Patent
Dickey et al.

(10) Patent No.: US 7,801,790 B1
(45) Date of Patent: Sep. 21, 2010

(54) HYBRID SECURITIES AND METHODS FOR THEIR ISSUANCE

(75) Inventors: John W. Dickey, New York, NY (US); Adam Dohrenwend, New York, NY (US); Stanley Louie, Brooklyn, NY (US); Michael Regan, New York, NY (US); Laura Stephenson, New York, NY (US); Vincent Vignale, New York, NY (US); Jee-Won Yang, Jersey City, NJ (US)

(73) Assignee: Citigroup Global Markets Inc., New York, NY (US)

( * ) Notice: Subject to any disclaimer, the term of this patent is extended or adjusted under 35 U.S.C. 154(b) by 489 days.

(21) Appl. No.: 11/506,519

(22) Filed: Aug. 17, 2006

Related U.S. Application Data

(60) Provisional application No. 60/709,182, filed on Aug. 17, 2005.

(51) Int. Cl.
*G06Q 40/00* (2006.01)
(52) U.S. Cl. .......................................... 705/36; 705/37
(58) Field of Classification Search ............... 705/36–37
See application file for complete search history.

(56) References Cited

U.S. PATENT DOCUMENTS

2004/0236660 A1* 11/2004 Thomas et al. ................ 705/37
2008/0052212 A1* 2/2008 Winsauer .................. 705/36 R

* cited by examiner

*Primary Examiner*—Thu Thao Havan
(74) *Attorney, Agent, or Firm*—Ropes & Gray LLP

(57) ABSTRACT

Securities, methods for raising capital using such securities, and systems for managing such securities are provided. The securities provide protection in bankruptcy to investors for a portion of deferred distributions earned by the investor on the security. The security may also provide a call protection period with limitations on capital replacement, and optional and/or mandatory deferral of distributions.

36 Claims, 2 Drawing Sheets

| Financial Instrument ID | 12345 |
|---|---|
| Issue Date | 7/25/2006 |
| Maturity Date | 7/25/2066 |
| Par Value | $25 |
| Optional Deferral Initiation Date | — |
| Mandatory Deferral Initiation Date | — |
| Accrued Distribution | .29 |
| Deferred Distribution | 0 |
| Capital Replacement Restriction Indicator | Covenant |
| Call Protection Period Length (years) | 5 |
| Max Optional Deferral Period (years) | 5 |
| Max Mandatory Deferral Period (years) | 5 |

HYBRID SECURITIES AND METHODS FOR THEIR ISSUANCE

REFERENCE TO RELATED APPLICATIONS

This application claims priority under 35 U.S.C. §119(e) to U.S. Provisional Application No. 60/709,182 titled "Hybrid Securities and Methods for Their Issuance" filed Aug. 17, 2005, the entirety of which is hereby incorporated by reference.

FIELD OF THE INVENTION

The invention relates in general to hybrid securities. More particularly, the invention relates to hybrid securities having certain equity-like characteristics.

BACKGROUND OF THE INVENTION

Companies typically have two options in raising capital to support their endeavors. They can issue debt, or they can issue equity. Debt is advantageous in that it does not directly affect the control of the company. However, the issuance of debt increases the risk shareholders carry due to debtors' higher priority for recovery in bankruptcy. Thus, shareholders are often wary of large issuances of debt. In addition, the issuance of debt typically results in an ongoing obligation to pay interest on that debt, limiting the flexibility of the company to use its resources. Failure to pay can result in default on the debt, which can potentially lead to bankruptcy.

Issuing additional equity has the advantage of not substantially increasing the risk of current shareholders. In addition, while many investors desire equity that pays dividends on a predictable basis, companies are not obligated to issue dividends on common or preferred stock. Failure to pay dividends may affect the stock price, but it will not lead directly to bankruptcy. Thus, from an operating perspective, the issuance of equity is safer for a company than issuing debt. Issuing additional equity can, however, dilute the value of the equity held by current shareholders and negatively affect the market for the company's stock.

SUMMARY OF THE INVENTION

The invention, in general, relates to hybrid securities that combine the beneficial aspects of equity and debt and reduces their concomitant disadvantages. More particularly, in one aspect, the invention relates to financial instruments that have par values and that accrue interest like debt at a fixed or floating rate, but for which only limited protection is given to an investor in the event of bankruptcy of the issuer. For example, in one embodiment, in bankruptcy, a holder of the financial instrument is only given priority over common stock holders for the par value of the financial instrument and a predetermined percentage, less than 100%, of deferred distributions. In such cases, the holder of the financial instrument may only receive priority for about 50%, about 40%, about 25%, or about 10% of the value of his or her deferred distributions. Alternatively, the holder of the financial instrument is given priority in bankruptcy above preferred shareholders, but below subordinated debtors for predetermined percentage of deferred distributions. The remainder of deferred distributions may be waived completely, may be made contingent, or may be accorded a lower priority level than the predetermined percentage of the deferred distributions. In various implementations, the deferred distributions receiving limited or no protection in bankruptcy include only mandatory deferred distributions, only optionally deferred distributions, or total deferred distributions.

The financial instrument also has a maturity date, upon which the issuer of the financial instrument is obligated to pay the investor the par value of the financial instrument. In one embodiment, the maturity date is between about 40 and about 60 years from the date of issuance of the financial instrument. In various specific implementations, the maturity date is about 40 years, about 50 years, or about 60 years, respectively, from the issuance of the financial instrument.

Payment of distributions to investors, in one embodiment, can be deferred at the option of the issuer, much as an issuer of stock can decide not to pay dividends to stockholders. The amount of time distributions can be deferred may be limited by the terms of the financial instrument, for example, to between about 1 and about 10 consecutive years. In various embodiments, the optional deferral period is limited to about 3, 5, 7, or 9 consecutive years.

Alternatively, or in addition, the financial instrument may require deferral of distributions upon the occurrence of various, preferably, pre-specified events. For example, the financial instrument may require the issuer of the financial instrument to defer distributions. Such mandatory deferral may result from supervisory actions (e.g., actions from a regulatory body) or on the issuer's performance meeting predetermined criteria.

In some circumstances, the issuer is required to pay distributions accruing on the financial instrument using the proceeds from the issuance of predetermined securities, barring certain market disruption events or regulatory actions. Such predetermined securities may include, for example, common or preferred stock of the issuer or of a company that owns the issuer.

In one embodiment, the financial instrument limits the ability of the issuer to redeem the financial instrument from an investor within a predetermined time period ("call protection period"). For example, the call protection period may last from about 1 to about 10 years from issuance of the financial instrument. In various implementations, the call protection period may last 1, 3, 5, 7, 9, or 10 years from the issuance of the financial instrument. The financial instrument, in one embodiment, includes a provision overriding the call protection period upon the occurrence of one or more designated events. The designated events include changes to the tax laws and regulations that would alter the tax or regulatory treatment of the financial instrument or the issuer of the financial instrument. Redemption of the financial instrument may further be restricted, in various embodiments, by expressions of intent or legally binding covenants from the issuer of the financial instrument to only redeem the financial instruments using the proceeds of the sale of securities having at least as equity-like characteristics as the financial instrument.

The issuer of the financial instrument may be an operating company, such as, without limitation, a bank, an insurance company, or a standard corporation.

Alternatively, the issuer may be a special purpose vehicle created by and/or wholly owned by an operating company, created to raise capital for the operating company. Suitable special purpose vehicles include, for example, a statutory trust or a limited liability company.

The financial instrument in such cases can take the form of a preferred security or other fixed income security. The operating company issues debt instruments to the special purpose vehicle in exchange for capital. These debt instruments may be the only asset of the special purpose vehicle. Alternatively, the special purpose vehicle may own additional assets, preferably fixed-income instruments. The capital paid to the operating company is raised from the sale of the financial instrument. The distributions on the financial instrument are paid for from interest earned on the debt instruments issued by the operating company. In one such embodiment, the financial instrument includes a guarantee that any interest paid to the special purpose vehicle issuing the financial instrument will be paid out in the form of the accrued distributions to the investor or investors holding such financial instruments.

In another aspect, the invention relates to a method of raising capital. The method includes issuing financial instruments, such as the financial instruments described above. In one embodiment, the method includes expressing an intention, by the issuer of the financial instrument, not to redeem the financial instruments with funds other than those raised from the sale of securities having at least as equity-like characteristics as the financial instrument. In another embodiment, the method includes covenanting, by the issuer, not to redeem the financial instruments other than with funds raised from the sale of securities having at least as equity-like characteristics as the financial instrument.

In another aspect, the invention relates to a system for managing financial instruments such as those described above. The system includes a database and logic for managing the financial instruments. For example, the logic may include call protection logic, distribution logic, default calculation logic, optional deferral logic, and mandatory deferral logic.

BRIEF DESCRIPTION OF THE DRAWINGS

The invention may be better understood from the following illustrative descriptions with reference to the following drawings.

DETAILED DESCRIPTION OF CERTAIN ILLUSTRATIVE EMBODIMENTS

To provide an overall understanding of the invention, certain illustrative embodiments will now be described, including methods for raising capital, financial instruments for use therein, and a system for managing the same. However, it will be understood by one of ordinary skill in the art that the methods, financial instruments, and systems described herein may be adapted and modified as is appropriate for the application being addressed and that the systems and methods described herein may be employed in other suitable applications, and that such other additions and modifications will not depart from the scope hereof.

Figure 1:
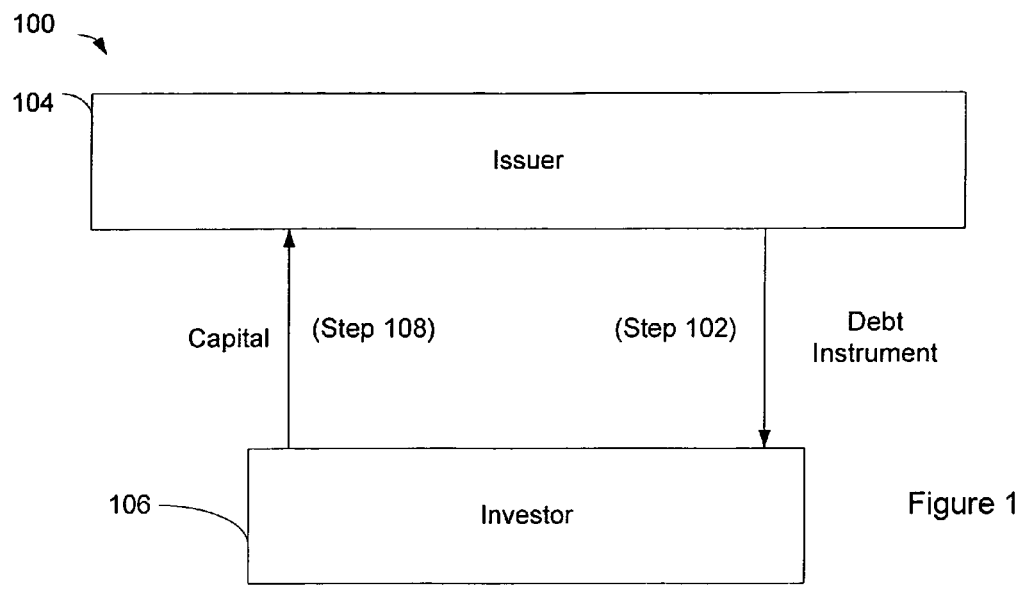
FIG. 1 is a block diagram of a first capital raising method, according to an illustrative embodiment of the invention.

FIG. 1 is a block diagram of a method of raising capital according to an illustrative embodiment of the invention. The method includes the issuance of a financial instrument (described further below) (step 102) from an operating company 104 to an investor 106. In exchange, the investor pays the operating company the par value of the financial instrument (step 108). The operating company 104 can be any type of company, including, for example, a bank, an insurance company, or a standard corporation. The investor 106 can be an institutional investor, such as a retirement fund, bank, insurance company, money manager, hedge fund or other large entity investor. Alternatively, or in addition, the investor 106 may be a retail investor. The method may also include the operating company 104 expressing an intent or providing a covenant that it will not redeem the financial instrument, unless the funds used to do so were raised from the sale of other securities having at least as equity-like characteristics as the financial instrument. The expression of intent is not legally binding, whereas the covenant is. This expression of intent or covenant provides additional security to existing debtholders of the operating company 104 that the operating company 106 will not refinance the debt created by issuing the financial instrument with a form of debt which is less advantageous to the existing debtholders.

In one illustrative implementation, the financial instrument issued in step 102 is preferably a deeply subordinated debt instrument. In one particular example, the debt instrument has a maturity date of 60 years from issuance and a par value of $25. As common equity does not have a maturity date, the further the maturity date is from the issuance of the debt instrument, the more equity-like the debt instrument becomes. The debt instrument includes a call protection period, during which the operating company 104 cannot redeem the debt instrument from the investor unless a designated event occurs. Such designated events include a change in the tax treatment of the debt instrument. The call protection period is 5 years from the date of issuance of the debt instrument.

The illustrative debt instrument accrues interest at a fixed percent and is paid out quarterly. As mentioned above, a company is not required to pay its shareholders dividends. Thus, to increase the equity-like nature of the debt instrument, the debt instrument allows for, at the option of the operating company 104, the operating company 104 to defer payment of accrued interest, also referred to as distributions, for up to a predetermined amount of time, for example 5 years. Such deferrals are referred to as optional deferrals. In certain circumstances, for example, the failure of the operating company 104 from meeting predetermined financial goals, the debt instrument forbids the operating company 104 from paying out accrued distributions. Such deferrals are referred to as mandatory deferrals. After 5 consecutive years of optional deferral and immediately after the mandatory deferral, deferred distributions preferably must be repaid from the sale of certain designated securities to other investors. Mandatory deferral together with optional deferral can last up to 10 years before investors can accelerate the securities.

In bankruptcy, the investor 106 has limited protection for his or her investment in the debt instrument. Upon liquidation of the operating company 104, the debt instrument provides a claim to the investor 106 for the par value of the debt instrument, and 25% of the value of the deferred accrued distributions owed to the investor 106. This priority ranks above preferred stockholders and below subordinated junior debt holders, i.e., the priority assigned to standard trade creditors. The remainder of the deferred distributions is either waived entirely, made contingent, or given priority only senior to common shareholders.

Various parameters of the debt instrument can be modified without it falling outside the scope of the invention. For example, the par value can be any value selected by the operating company 104. The interest rate on the debt instrument can be floating, instead of fixed. For example, the interest rate may be tied to a market interest rate such as the Prime or LIBOR rates. Instead of being paid quarterly, the interest can be distributed monthly, semi-annually, or annually. Similarly, the call protection period may last between about 1 and about 10 years. For example, the call protection period may last about 1, about 3, about 5, about 7, about 9, or about 10 years. The call protection period may also last more than 10 years from the issuance of the debt instrument. The maturity date may also vary and remain within the scope of the invention. The maturity date is preferably between about 40 years to about 60 years from the date of issuance of the debt instrument. For example, it might be about 40 years, about 50 years, or about 60 years from the date of issuance of the debt instrument. The bankruptcy protection percentage may be selected to be any percentage less than 100%. Preferably, the bankruptcy protection percentage is between about 5% and about 50%. It may be about 50%, about 40%, about 25%, about 10%, or about 5%. In addition, the bankruptcy protection percentage may only apply to deferred distributions arising from mandatory distribution deferral instead of all deferred distributions. In such cases, 100% of optionally deferred distributions are given the same priority given to the par value and the protected portion of mandatory deferred distributions. In some implementations, the debt instrument only provides for optional deferral of distributions or only mandatory deferral of distributions. The length of the deferral periods, both optional and/or mandatory, may also take on different values. The deferral periods may each last up to a predetermined period of time preferably less than ten years. For example, either of the deferral periods can be limited to about 5, about 7, or about 10 consecutive years.

Figure 2:
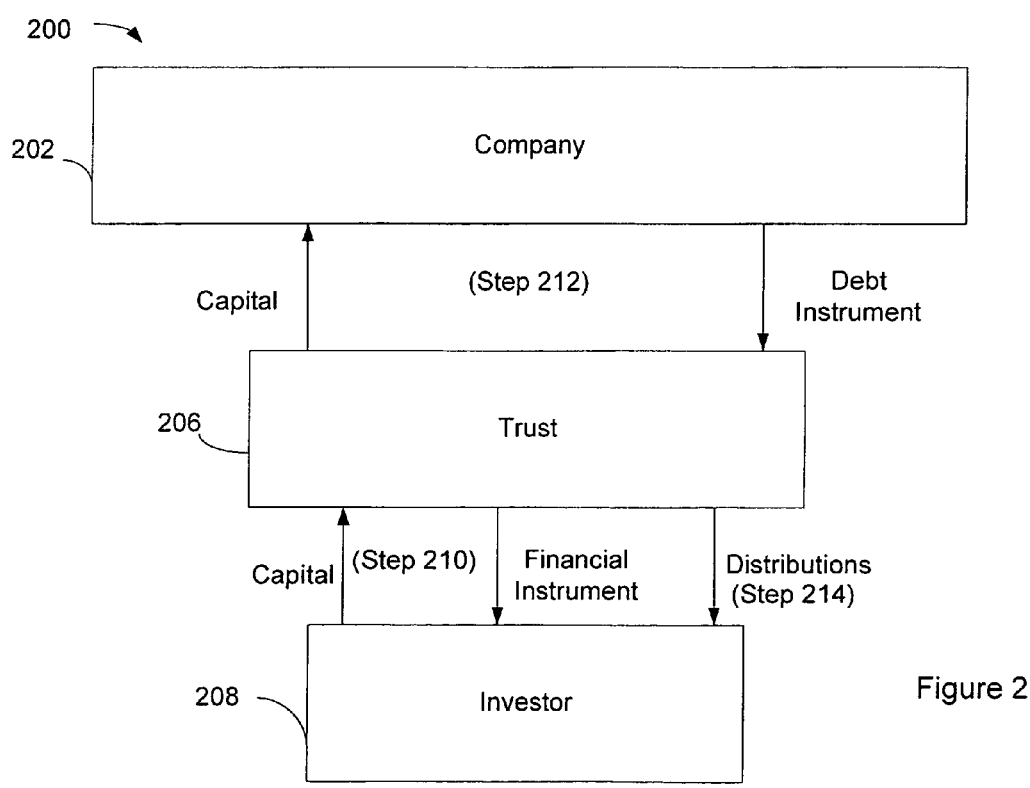
FIG. 2 is a block diagram of a second capital raising method, according to an illustrative embodiment of the invention.

FIG. 2 is a block diagram of another method of raising capital according to an illustrative embodiment of the invention. The method 200 includes an operating company 202 creating a holding entity in the form of a special purpose vehicle, such as a trust 206. More specifically, the trust 206 is preferably a statutory trust. The trust 206 sells a financial instrument to investors 208 (step 210). The trust 206 exchanges the funds raised from the sale of the financial instrument for debt instruments, such as the debt instruments described above (step 212). The trust 206 then pays the investors distributions using the income received from interest earned on the debt instruments (step 214).

The financial instrument issued to investors 208 in step 210 preferably shares the same or similar terms as the debt instrument exchanged between the operating company 202 and the trust 206. The financial instrument issued by the trust 206 preferably has the following different characteristics. Instead of being a debt instrument, the financial instrument issued by the trust 206 is preferably a preferred security. In addition, the financial instrument preferably includes a guarantee from the operating company 202 that all proceeds paid into the trust 206 by the operating company 202 will be paid to the investors 208 to satisfy any accrued distributions.

Figures 3, 4:
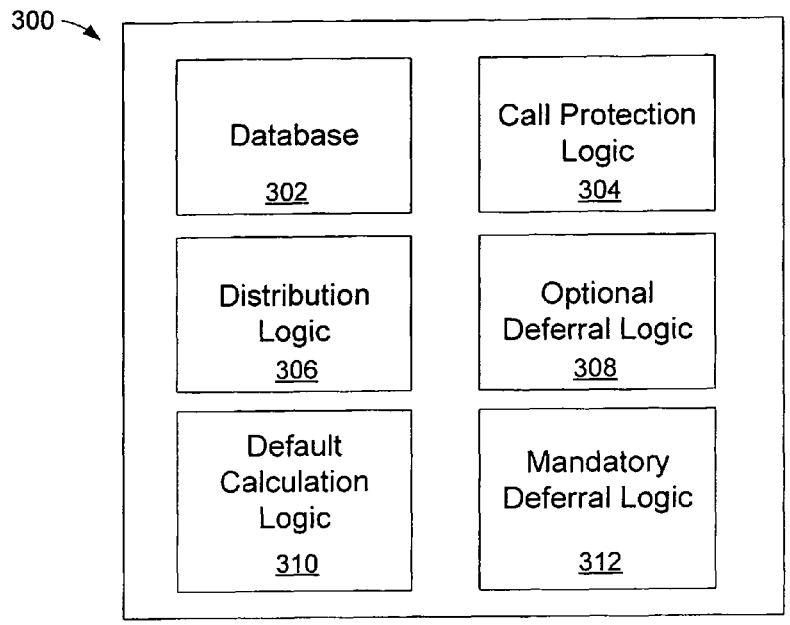
FIG. 3 is a block diagram of system for managing financial instruments, according to an illustrative embodiment of the invention.
FIG. 4 is an illustrative data table from a database included in the system of FIG. 3, according to an illustrative embodiment of the invention.

FIG. 3 is a block diagram of a system 300 for managing the financial instruments described above. The system 300 includes a database 302 and various logic components. The database may be a standard relational database designed to maintain the appropriate data fields, or it may be custom built to manage the financial instruments.

FIG. 4 is an illustrative data table 400 from the database 302. The database 302 stores, for each financial instrument issued, a unique identifier 402, the date the financial instrument was issued 404, the maturity date of the financial instrument 405, the par value of the financial instrument 406, a date on which distributions began to be optionally deferred 408, a mandatory distribution deferral distribution date 410, an accrued distribution amount 412, and a deferred distribution amount 414. The database 302 also stores a capital replacement restriction indicator 416 indicative of whether the issuer of the security expressed an intention or covenanted to redeem the securities using only funds from the proceeds of the sale of other securities having at least as equity-like characteristics as the financial instrument. The database 302 also stores values indicative of the length of the call protection period 418 and the maximum lengths of the optional and mandatory deferral periods 420 and 422. The database may aggregate the data related to the financial securities by investor, issue date, deferral initiation date, or any other data field.

Referring back to FIG. 3, the system 300 includes the following logic components: call protection logic 304, distribution logic 306, optional deferral logic 308, mandatory deferral logic 310, and default calculation logic 312. A logic component may be implemented as a hardware circuit comprising custom VLSI circuits or gate arrays, off-the-shelf semiconductors such as logic chips, transistors, or other discrete components. A logic component may also be implemented in programmable hardware devices such as field programmable gate arrays, programmable array logic, programmable logic devices or the like.

Logic components may also be implemented in software for execution by various types of processors. An identified logic component of executable code may, for instance, comprise one or more physical or logical blocks of computer instructions which may, for instance, be organized as an object, procedure, or function. Nevertheless, the executables of an identified logic component need not be physically located together, but may comprise disparate instructions stored in different locations which, when joined logically together, comprise the logic component and achieve the stated purpose for the logic component.

Indeed, a logic component of executable code could be a single instruction, or many instructions, and may even be distributed over several different code segments, among different programs, and across several memory devices. Similarly, operational data may be identified and illustrated herein within logic components, and may be embodied in any suitable form and organized within any suitable type of data structure. The operational data may be collected as a single data set, or may be distributed over different locations including over different storage devices, and may exist, at least partially, merely as electronic signals on a system or network.

The call protection logic 304 enforces the call protection period terms included in the financial instruments. Upon receiving an instruction to redeem a financial instrument, the call protection logic 304 compares the current date to the issue date of the financial instrument and the length of the call protection period stored in the database 302. If the current date is within the call protection period, the call protection logic 304 verifies whether a designated event has occurred. If such an event has not occurred, the call protection logic blocks the redemption of the financial instrument. If such an event has occurred, the call protection logic 304 allows the redemption to proceed.

The distribution logic 306 calculates and/or executes the distributions owed to investors. The distribution logic 306, in conjunction with the optional deferral logic 308, enforces distribution guarantees included in the financial instruments. The optional deferral logic 308 provides functionality for an issuer to withhold distributions to investors. For example, upon receiving a first instruction to defer distributions, the optional deferral logic 308 stores the deferral initiation date in the database and prevents the distribution logic 306 from making distributions until instructed otherwise. The optional distribution logic 308 restricts the length of the optional deferral to the maximum optional deferral period stored in the database 302. Upon expiration of this time period, the optional deferral logic 308 queries the mandatory deferral logic 310. The mandatory deferral logic 310 determines whether further deferral is required. If so, the mandatory deferral logic 310 continues to withhold distributions to the investor. Otherwise, the mandatory deferral logic 310 instructs the distribution logic 306 to distribute the deferred distributions to the investor.

The default calculation logic 312 determines how much money an investor shall receive prioritized protection for in the event of bankruptcy of the issuer. This default calculation logic 312 combines the par values of all financial instruments held by investor along with the corresponding predetermined percentage of deferred distributions (mandatory or total).

The invention may be embodied in other specific forms without departing from the spirit or essential characteristics thereof. The forgoing embodiments are therefore to be considered in all respects illustrative, rather than limiting of the invention.

What is claimed is:

1. A system for managing payments for a financial instrument comprising:
    a database for storing for the financial instrument an issue date, a par value, a deferral initiation date, and a deferred distribution amount; and
    default calculation logic for determining an amount a purchaser of the financial instrument is given priority over common stock holders but below junior subordinated debt holders if an issuer of the financial instrument enters bankruptcy, wherein the amount given priority is calculated to be equal to the par value plus a predetermined percentage, less than 100%, of the deferred distribution amount.

2. A method of raising capital comprising:
    issuing, by a trust owned by an operating company, a financial instrument to an investor, wherein the trust holds as its sole asset, debt instruments issued by the operating company, and wherein the financial instrument includes a par value, accrues distributions, provides the trust the option to defer payment of accrued distributions up to a predetermined length of time, and provides the investor protection in bankruptcy senior to common stock holders but below junior subordinator debtors for at least a predetermined portion of amounts owed to the investor on the financial instrument; and
    determining, by default calculation logic, an amount a purchaser of the financial instrument is given priority over common stock holders but below junior subordinated debt holders if the trust enters bankruptcy.

3. The method of claim 2, wherein the trust comprises a statutory trust.

4. The method of claim 2, wherein the default calculation logic determines the amounts owed to the investor based on the par value and unpaid accrued distributions.

5. The method of claim 2, comprising allowing, by call protection logic, the trust to redeem the financial instrument after a predetermined call protection period.

6. The method of claim 5, comprising allowing, by call protection logic, the trust to redeem the financial instrument within the call protection period upon an occurrence of a designated event.

7. The method of claim 2, comprising requiring, by mandatory deferral logic, the trust to withhold accrued distributions to the investor in response to meeting a predetermined condition.

8. The method of claim 2, comprising applying, by distribution logic, a predetermined fixed rate as the accrual rate.

9. The method of claim 2, comprising applying, by distribution logic, a predetermined floating rate as the accrual rate.

10. The method of claim 2, comprising, expressing an intent, by the operating company, to redeem the financial instrument from the investor using only proceeds from the sale of a security having at least as equity-like characteristics as the financial instrument.

11. The method of claim 2, comprising, covenanting, by the operating company, to redeem the financial instrument from the investor using only proceeds from the sale of a security having at least as equity-like characteristics as the financial instrument.

12. The method of claim 2, comprising trading by the trust, the proceeds of the sale of the financial instrument for the debt instruments issued by the operating company, wherein the accrued distributions are paid for, by distribution logic, using payments made to the trust on the debt instruments held by the trust.

13. The method of claim 12, wherein the debt instruments held by the trust have provisions substantially similar to those of the financial instrument.

14. The method of claim 2, comprising paying, by distribution logic, after deferral, the accrued deferred distributions using the proceeds of sales of predetermined securities.

15. The method of claim 2, wherein the financial instrument comprises a preferred financial instrument.

16. The method of claim 2, wherein the financial instrument has a maturity date of at least 38 years after the sale of the first debt instrument.

17. The method of claim 2, wherein the financial instrument has a maturity date of at least 50 years after the sale of the first debt instrument.

18. The method of claim 2, wherein the financial instrument has a maturity date of at least 60 years after the sale of the first debt instrument.

19. The method of claim 2, wherein the optional deferral logic allows the trust to withhold, at its option, distributions for up to 5 consecutive years.

20. The method of claim 2, wherein the optional deferral logic allows the trust to withhold, at its option, distributions for up to 7 consecutive years.

21. The method of claim 2, wherein the optional deferral logic allows the trust to withhold, at its option, distributions for up to 10 consecutive years.

22. The method of claim 2, wherein the optional deferral logic allows the trust to withhold, at its option, distributions for more than 10 consecutive years.

23. The method of claim 2, wherein the predetermined portion is equal to the par value plus up to 50% of deferred distributions.

24. The method of claim 2, wherein the predetermined portion is equal to the par value plus up to 40% of deferred distributions.

25. The method of claim 2, wherein the predetermined portion is equal to the par value plus up to 25% of deferred distributions.

26. The method of claim 2, wherein the predetermined portion is equal to the par value plus up to 10% of deferred distributions.

27. The method of claim 2, wherein the predetermined portion is equal to the par value plus up to 100% of deferred distributions.

28. The method of claim 2, wherein the operating company guarantees to the investor that all payments made on the debt instruments owned by the trust will be distributed among the investor and other investors if the investor or the other investors have accrued distributions.

29. The method of claim 2, wherein the predetermined portion of the deferred distributions provided priority in bankruptcy over common stock holders is given priority over preferred stock holders.

30. The method of claim 2, wherein the default calculation logic applies the predetermined percentage solely to mandatory deferrals, and wherein the financial instrument provides priority over common stock holders to 100% of optional deferred distributions.

31. The method of claim 2, wherein the financial instrument waives all claim to the deferred distributions exceeding the predetermined portion.

32. The method of claim 2, wherein the financial instrument provides the investor lower priority to deferred distributions exceeding the predetermined portion.

33. The system of claim 1, comprising call protection logic for prohibiting redemption of the financial instrument until after a predetermined call protection period unless predetermined conditions have been met, wherein the length of the call protection period is stored in the database.

34. The system of claim 1, comprising distribution logic for determining and executing the payment of distributions accruing based on the financial instrument.

35. The system of claim 1, comprising optional deferral logic for enabling the issuer of the financial instrument, at its option, to withhold accrued distributions determined by the distribution logic from the investor for a predetermined number of years stored in the database.

36. The system of claim 1, comprising mandatory deferral logic for prohibiting the distribution logic from executing distributions of accruals from the financial instrument.

* * * * *